(12) United States Patent
Carlson et al.

(10) Patent No.: US 9,238,712 B2
(45) Date of Patent: Jan. 19, 2016

(54) TAGGED POLYMERS AND METHODS OF USE

(71) Applicant: Empire Technology Development LLC, Wilmington, DE (US)

(72) Inventors: William Brenden Carlson, Seattle, WA (US); Gregory David Phelan, Cortland, NY (US); Vincenzo Casasanta, III, Woodinville, WA (US)

(73) Assignee: EMPIRE TECHNOLOGY DEVELOPMENTS LLC, Wilmington, DE (US)

( * ) Notice: Subject to any disclaimer, the term of this patent is extended or adjusted under 35 U.S.C. 154(b) by 170 days.

(21) Appl. No.: 13/827,155

(22) Filed: Mar. 14, 2013

(65) Prior Publication Data

US 2014/0039147 A1     Feb. 6, 2014

(30) Foreign Application Priority Data

Aug. 2, 2012 (WO) ................ PCT/US2012/049265

(51) Int. Cl.
| | |
|---|---|
| *C08G 75/00* | (2006.01) |
| *C08G 63/00* | (2006.01) |
| *C08G 64/00* | (2006.01) |
| *C08G 65/38* | (2006.01) |
| *C08G 65/40* | (2006.01) |
| *C08G 65/42* | (2006.01) |

(52) U.S. Cl.
CPC ................ *C08G 65/38* (2013.01); *C08G 65/40* (2013.01); *C08G 65/405* (2013.01); *C08G 65/42* (2013.01); *C08G 2650/56* (2013.01)

(58) Field of Classification Search
CPC ........................................................ C08G 65/38
USPC ................................................. 528/193, 212
See application file for complete search history.

(56) References Cited

U.S. PATENT DOCUMENTS

| | | |
|---|---|---|
| 2003/0021998 A1 | 1/2003 | Hubbard et al. |
| 2003/0035917 A1 | 2/2003 | Hyman |
| 2009/0266991 A1 | 10/2009 | Evans et al. |

FOREIGN PATENT DOCUMENTS

| | | |
|---|---|---|
| JP | 05-178776 | 12/1991 |

OTHER PUBLICATIONS

International Search Report and Written Opinion of the International Searching Authority in International Application No. PCT/US2012/49265 mailed Oct. 16, 2012 (12 pages).

*Primary Examiner* — David Karst
(74) *Attorney, Agent, or Firm* — Foley & Lardner LLP

(57) ABSTRACT

A polymer includes a monomeric repeat unit represented by Formula I:

In Formula I, $R^1$ is alkyl, alkenyl, alkynyl, aryl, heteroaryl, cycloalkyl, or heterocyclyl; $R^2$ is alkyl, haloalkyl, alkenyl, alkynyl; $R^3$ is alkyl, OH, halo, or alkoxy; $R^4$ is alkyl, OH, halo, or alkoxy; Y is absent, C(O), $C_1$-$C_4$ alkylidene, or $C_1$-$C_4$ alkylideneamino; L is alkylidene, alkylidene-O-alkylidene, alkylidene-S-alkylidene, alkenylidene, cycloalkylidene, arylene, heteroarylene, C(O)O, or C(O)S; n1 is 0, 1, 2, 3, or 4; and n2 is 0, 1, 2, 3, or 4.

20 Claims, No Drawings

TAGGED POLYMERS AND METHODS OF USE

CROSS-REFERENCE TO RELATED APPLICATIONS

This application claims priority to International Application No. PCT/US2012/049265, filed on Aug. 2, 2012, which is incorporated by reference in its entirety for any and all purposes.

FIELD

The present technology relates to polymers that can be tagged and tracked and to articles that are made from such polymers.

BACKGROUND

The following description is provided to assist the understanding of the reader. None of the information provided or references cited is admitted to be prior art to the present technology.

Environmental contamination by epoxy resins and bisphenol A, the primary component of most epoxy resins, is an increasing problem. However, the full measure of this problem remains unknown. Epoxy resins are increasingly used to make moldable plastics and numerous consumer products including toys and electronics. Epoxy resins are also incorporated into more substantial goods such as airplane fuselages. Most epoxy resins are made from bisphenol A which is itself produced from the condensation of acetone and phenol. Consequently, the epoxy resins from discarded products that accumulate in landfills can leach bisphenol A, phenol, and other toxins into groundwater and contaminate drinking supplies. There is an increasing need to prevent such environmental accumulation of epoxy resins and bisphenol A.

At present, the extent of environmental contamination by epoxy resins and bisphenol A is unknown because there is not a convenient and inexpensive means to track goods that contain these substances. In particular, the commercial producers of products lack a viable means to determine how much of their products are properly incinerated or recycled and how much of their products are disposed in landfills.

SUMMARY

The present technology provides "tagged" polymers that can tracked. Such tagged polymers can be incorporated into almost any product, including moldable thermoplastic materials such as toys and electronics. Alternatively, the tagged polymers can be incorporated into composite materials such as airplane fuselages. Such products are made, at least in part, from the tagged polymers described herein and can be tracked throughout their product lifecycles. Products, made from the tagged polymers described herein, can be tracked from the time they are produced, after they enter the marketplace, and at the end of their product life cycle e.g., as they reach incinerators or recycling centers. Consequently, by measuring how much of a product is properly incinerated or recycled, producers can more effectively estimate how much of the remaining products accumulate in the environment, e.g., in landfills. This ability to monitor products made from "tagged" polymers will allow producers and regulators to devise strategies that minimize the environmental impact of their products.

In accordance with one aspect, a polymer is provided, where the polymer includes a monomeric repeat unit represented by Formula I:

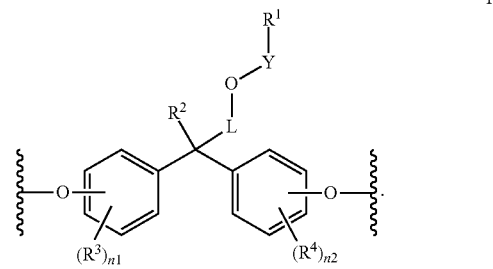

In Formula I, $R^1$ is alkyl, alkenyl, alkynyl, aryl, heteroaryl, cycloalkyl, or heterocyclyl; $R^2$ is alkyl, haloalkyl, alkenyl, alkynyl; $R^3$ is alkyl, OH, halo, or alkoxy; $R^4$ is alkyl, OH, halo, or alkoxy; Y is absent, C(O), $C_1$-$C_4$ alkylidene, or $C_1$-$C_4$ alkylideneamino; L is alkylidene, alkylidene-O-alkylidene, alkylidene-S-alkylidene, alkenylidene, cycloalkylidene, arylene, heteroarylene, C(O)O, or C(O)S; n1 is 0, 1, 2, 3, or 4; and n2 is 0, 1, 2, 3, or 4.

In accordance with another aspect, a polymer is provided, where the polymer is represented by Formula II:

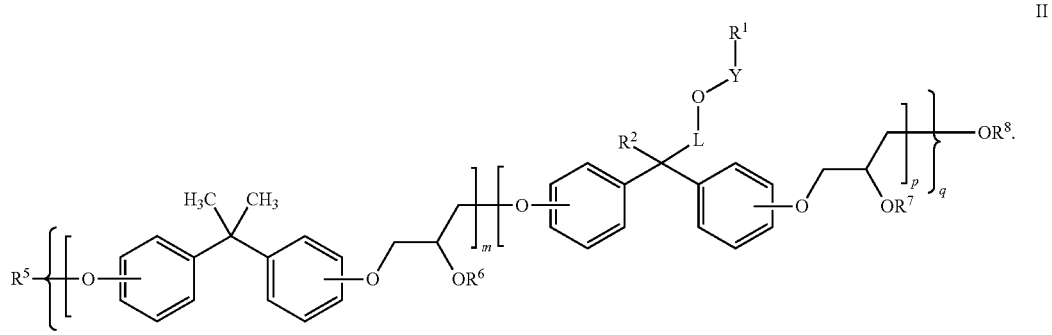

In Formula II, $R^1$ is alkyl, alkenyl, alkynyl, aryl, heteroaryl, cycloalkyl, or heterocyclyl; $R^2$ is alkyl; $R^5$, $R^6$, $R^7$ and $R^8$ are independently H or alkyl; Y is absent, C(O), $C_1$-$C_4$ alkylidene, or $C_1$-$C_4$ alkylideneamino; L is alkylidene, alkylidene-O-alkylidene, alkylidene-S-alkylidene, alkenylidene, cycloalkylidene, arylene, heteroarylene, C(O)O, or C(O)S; m, p and q are independently an integer of 1 to 1,000.

In accordance with yet another aspect, an article is provided, where the article includes a polymer, and where the polymer includes a monomeric repeat unit represented by Formula I or Formula II.

A method is provided for preparing a polymer is provided, where the method includes contacting a compound of Formula IV with a compound of Formula V

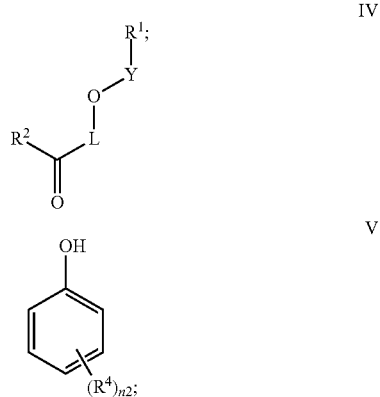

to form a compound of Formula VI

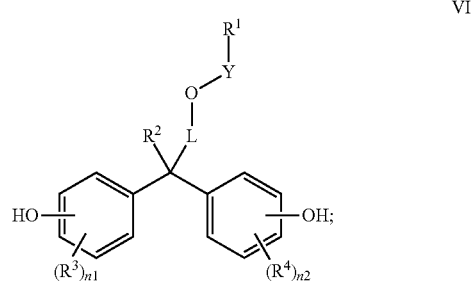

and contacting the compound of Formula VI with a linking compound to form the polymer, wherein the linking compound includes OC(O)O, SO$_2$, or an epoxide and the polymer includes a monomeric repeat unit represented by Formula I.

In another aspect, a method is provided for tracking an article, where the method includes determining the presence of a polymer within the article, wherein the polymer includes a monomeric repeat unit represented by Formula I.

The foregoing summary is illustrative only and is not intended to be in any way limiting. In addition to the illustrative aspects, embodiments and features described above, further aspects, embodiments and features will become apparent by reference to the following detailed description.

DETAILED DESCRIPTION

The illustrative embodiments described in the detailed description and claims are not meant to be limiting. Other embodiments may be utilized, and other changes may be made, without departing from the spirit or scope of the subject matter presented here.

The present technology is described herein using several definitions, as set forth throughout the specification.

As used herein, unless otherwise stated, the singular forms "a," "an," and "the" include plural reference. Thus, for example, a reference to "a monomer" includes a plurality of monomers, and a reference to "an article" is a reference to one or more articles.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

Alkyl groups include straight chain, branched chain, or cyclic alkyl groups having 1 to 24 carbons or the number of carbons indicated herein. In some embodiments, an alkyl group has 1 to 16 carbon atoms, 1 to 12 carbons, 1 to 8 carbons or, in some embodiments, 1 to 6, or 1, 2, 3, 4 or 5 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, isobutyl, sec-butyl, tert-butyl, neopentyl, isopentyl, and 2,2-dimethylpropyl groups. In some embodiments, the alkyl groups may be substituted alkyl groups.

Heteroalkyl groups include alkyl groups, as defined herein, substituted by one or more O, N, or S atoms.

Cycloalkyl groups are cyclic alkyl groups having from 3 to 10 carbon atoms. In some embodiments, the cycloalkyl group has 3 to 7 ring members, whereas in other embodiments the number of ring carbon atoms range from 3 to 5, 3 to 6, or 5, 6 or 7. Cycloalkyl groups further include monocyclic, bicyclic and polycyclic ring systems. Monocyclic groups include, e.g., cyclopropyl, cyclobutyl, cyclopentyl, cyclohexyl, and cycloheptyl groups. Bicyclic and polycyclic cycloalkyl groups include bridged or fused rings, such as, but not limited to, bicyclo[3.2.1]octane, decalinyl, and the like. Cycloalkyl groups include rings that are substituted with straight or branched chain alkyl groups as defined above. In some embodiments, the cycloalkyl groups are substituted cycloalkyl groups. Representative substituted alkenyl groups may be mono-substituted or substituted more than once, such as, but not limited to, mono-, di- or tri-substituted with substituents such as those listed above. Representative substituted alkyl groups may be mono-substituted or substituted more than once, such as, but not limited to, mono-, di- or tri-substituted with substituents such as those listed above.

Alkenyl groups include straight and branched chain alkyl groups as defined above, except that at least one double bond exists between two carbon atoms. Thus, alkenyl groups have from 2 to 24 carbon atoms, and typically from 2 to 10 carbons or, in some embodiments, from 2 to 8, 2 to 6, or 2 to 4 carbon atoms. Examples include, but are not limited to vinyl, allyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, among others. Representative substituted alkenyl groups may be mono-substituted or substituted more than once, such as, but not limited to, mono-, di- or tri-substituted with substituents such as those listed above.

The terms "alkylene," "cycloalkylene," "alkenylene," "arylene," "heteroarylene," and "alkylarylalkylene" alone or as part of another substituent means a divalent radical derived from an alkyl, cycloalkyl, alkenyl, aryl, heteroaryl, or alkylarylalkyl group, respectively, as exemplified by —CH$_2$CH$_2$CH$_2$CH$_2$—. For alkylene, cycloalkylene, alkenylene, arylene, heteroarylene, and alkylarylalkylene linking groups, no orientation of the linking group is implied.

The term "amine" (or "amino") as used herein refers to —NHR and —NRR' groups, where R, and R' are independently hydrogen, or a substituted or unsubstituted alkyl, alkenyl, alkynyl, cycloalkyl, aryl or aralkyl group as defined herein. Examples of amino groups include —$NH_2$, methylamino, dimethylamino, ethylamino, diethylamino, propylamino, isopropylamino, phenylamino, benzylamino, and the like.

The term "oxo" refers to a divalent oxygen group. While the term includes doubly bonded oxygen, such as that found in a carbonyl group, as used herein, the term oxo explicitly includes singly bonded oxygen of the form —O— which is part of a polymer backbone. Thus, an oxo group may be part of an ether linkage (—O—), an ester linkage (—O—C(O)—), a carbonate linkage (—O—C(O)O—), a carbamate linkage (—O—C(O)NH— or —O—C(O)NR—), and the like.

"Substituted" refers to a chemical group as described herein that further includes one or more substituents, such as lower alkyl (including substituted lower alkyl such as haloalkyl, hydroxyalkyl, aminoalkyl), aryl (including substituted aryl), acyl, halogen, hydroxy, amino, alkoxy, alkylamino, acylamino, thioamido, acyloxy, aryloxy, aryloxyalkyl, carboxy, thiol, sulfide, sulfonyl, oxo, both saturated and unsaturated cyclic hydrocarbons (e.g., cycloalkyl, cycloalkenyl), cycloheteroalkyls and the like. These groups may be attached to any carbon or substituent of the alkyl, alkenyl, alkynyl, aryl, cycloheteroalkyl, alkylene, alkenylene, alkynylene, arylene, hetero moieties. Additionally, the substituents may be pendent from, or integral to, the carbon chain itself.

The term "tagged polymer," as used herein, refers to a polymer having a substituent $R^1$, as described herein, that enables one of skill in the art to identify or characterize and/or quantify tagged polymer e.g., relative to untagged polymer or other materials. In some embodiments, substituent $R^1$ includes a chromophoric moieties, fluorescent moiety, or radioisotopes. The polymer can be characterized by conventional methods e.g., nuclear magnetic resonance spectroscopy, infrared spectroscopy, mass spectrometry, fluorimetry, radioisotopic decay detection, and ultraviolet spectroscopy.

In some embodiments, substituent $R^1$ includes a chromophoric or fluorescent group, where the chromophoric or fluorescent group is pyrene, benzopyrene, perylene, terrylene, quaterrylene, pentatrylene, hexatrylene, hepatrylene, octarylene, fluorene, vinyl carbazole, thiazole, phenylene oxide, N,N,N',N'-tetramethylacridine-3,6-diamine, 2,7-dimethylacridine-3,6-diamine, and derivatives thereof. In some embodiments, substituent $R^1$ is selected from the group consisting of fluorescein, acridine, cyanine, fluorone, oxazin, phenanthridine, rhodamine, or a derivative thereof. In some embodiments, the chromophoric or fluorescent group is brominated or iodated.

In some embodiments, substituent $R^1$ includes a chromophoric or fluorescent group. Illustrative chromophoric or fluorescent groups include, but are not limited to, pyrene, benzopyrene, perylene, terrylene, quaterrylene, pentatrylene, hexatrylene, hepatrylene, octarylene, fluorene, vinyl carbazole, thiazole, phenylene oxide, N,N,N',N'-tetramethylacridine-3,6-diamine, 2,7-dimethylacridine-3,6-diamine and acrylamides thereof, and (meth)acrylates of fluorescein.

In some embodiments, substituent $R^1$ includes a fluorescent group. Illustrative fluorescent groups include, but are not limited to, fluorescent dyes. In some embodiments, the fluorescent dye is brominated or iodoated. Illustrative fluorescent dyes that can be brominated or iodoated include, but are not limited to, acridine dye, cyanine dye, fluorone dye, oxazin dye, phenanthridine dye, rhodamine dye, acridine orange, acridine yellow, Alexa Fluor, 7-aminoactinomycin D, 8-anilinonaphthalene-1-sulfonate, ATTO dyes, auramine-rhodamine stain, benzanthrone, bimane, 9,10-bis(phenylethynyl)anthracene, 5,12-bis(phenylethynyl)naphthacene, blacklight paint, Brainbow, calcein, carboxyfluorescein, carboxyfluorescein diacetate succinimidyl ester, carboxyfluorescein succinimidyl ester, 1-chloro-9,10-bis(phenylethynyl)anthracene, DyLight Fluor, ethidium bromide, Fluo-4, FluoProbes, fluorescein, fluorescein isothiocyanate, Fluoro-Jade stain, Fura-2, Fura-2-acetoxymethyl ester, green fluorescent protein, heptamethine dyes, Hoechst stain, Indian yellow, Indo-1, Lucifer yellow, luciferin, phycoerythrin, phycoerythrobilin, propidium iodide, pyranine, rhodamine, Rhodamine 123, Rhodamine 6G, RiboGreen, rubrene, (E)-stilbene, (Z)-stilbene, Sulforhodamine 101, Sulforhodamine B, SYBR Green I, Synapto-pHluorin, tetraphenyl butadiene, tetrasodium tris(bathophenanthroline disulfonate)ruthenium (II), Texas Red, Titan yellow, TSQ, 2-chloro-9,10-bis(phenylethynyl)anthracene, 2-chloro-9,10-diphenylanthracene, coumarin, DAPI, dark quencher, DiOC6, MCherry, Merocyanine, Nile blue, Nile red, optical brightener, perylene, phloxine, phycobilin, and umbelliferone.

In some embodiments, substituent $R^1$ is group that includes a radioisotope. Illustrative radioisotopes include, but are not limited to, carbon-14, iron-59, iron-55, iodine-131, sodium-24, thallium-201, technetium-99m, radium-226, phosphorus-32, cobalt-60, potassium-37, uranium-238, and fluorine-18.

The tagged polymers may include tagged bisphenol monomers, according to Formula I, and untagged bisphenol monomers. For example, the tagged bisphenol monomers relative to untagged bisphenol monomers may be a ratio of about 1:10,000, about 1:1,000, about 1:100, about 1:10, about 1:1, and ranges between any two of these values. In some embodiments, $R^1$ in Formula I is alkyl, aryl or heteroaryl. In some embodiments, $R^1$ in Formula I is enriched in $^{13}C$ in one or more carbon atoms of $R^1$. In some embodiments, $R^1$ in Formula I is a chromophore, a radioisotope, or a fluorophore. In some embodiments, $R^1$ in Formula I is a coumarin, rhodamine, or diaryldiazo group. In some embodiments, the tagged polymer is a copolymer including at least one of a polyacrylate, a polymethacrylate, a polyolefin, a polyepoxy, a polyurethane, or a polyurea.

The term "moldable thermoplastic material," as used herein, refers to thermoplastic polymers known in the art, including polymers including at least one of a polyacrylate, a polymethacrylate, a polyolefin, a polyepoxy, a polyurethane, or a polyurea.

The present technology generally provides "tagged" polymers that can be tracked. Such tagged polymers can be incorporated into almost any product, including moldable thermoplastic materials such as toys and electronics. Alternatively, the tagged polymers can be incorporated into composite materials such as airplane fuselages. Such products made, at least in part, from tagged epoxy resins can be tracked throughout their lifecycle at the point of production and at incinerators or recycling centers. Consequently, producers can more effectively determine how much of their products are being properly incinerated or recycled and how much accumulate in the environment e.g., in landfills.

The polymers described herein can be used to make plastic goods or plastic containing articles for any application. For example, illustrative articles that are made from the polymers described herein include, but are not limited to, a moldable thermoplastic material, epoxy or polycarbonate casting, epoxy or polycarbonate resin, epoxy adhesive, toy, container (e.g., bottle, drinking container, etc.) component for an electronic device (e.g., printed circuit boards, electromagnetic wires, wire lamination, etc.), organic light-emitting diode, component for an automobile, aircraft part or component (e.g., fuselage), medical implant, construction material, paint, coating (e.g., coil or can coatings) data storage device (e.g., compact disc, DVD, etc.), badge, trinket, optical recording, non-linear optics telecommunication, bullet proof media, automotive lighting (e.g., tail light, headlight, side striping, navigational lighting, etc.), aerospace material, glowing material on clothing (e.g., shoes). In some embodiments, the article can be recycled.

In accordance with one aspect, a polymer is provided, where the polymer includes a monomeric repeat unit represented by Formula I:

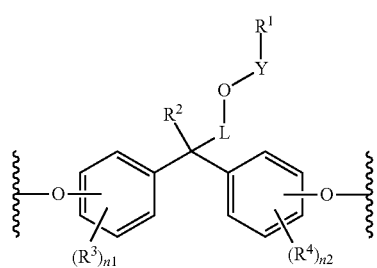

In Formula I, $R^1$ is alkyl, alkenyl, alkynyl, aryl, heteroaryl, cycloalkyl, or heterocyclyl; $R^2$ is alkyl, haloalkyl, alkenyl, alkynyl; $R^3$ is alkyl, OH, halo, or alkoxy; $R^4$ is alkyl, OH, halo, or alkoxy; Y is absent, C(O), $C_1$-$C_4$ alkylidene, or $C_1$-$C_4$ alkylideneamino; L is alkylidene, alkylidene-O-alkylidene, alkylidene-S-alkylidene, alkenylidene, cycloalkylidene, arylene, heteroarylene, C(O)O, or C(O)S; n1 is 0, 1, 2, 3, or 4; and n2 is 0, 1, 2, 3, or 4.

In some embodiments, the polymer includes a monomeric repeat unit represented by Formula IA:

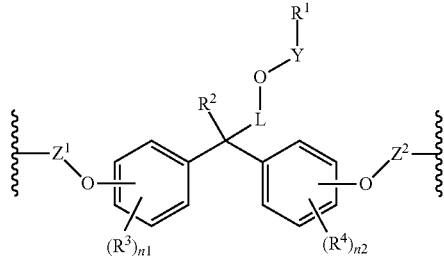

In Formula IA, $Z^1$ is absent, CO, OC(O)O, $SO_2$, acrylate, or epoxide; and $Z^2$ is absent, CO, OC(O)O, $SO_2$, acrylate, or epoxide.

The polymers of Formula I and Formula IA have a weight average molecular weight (Mw) of about 500 g/mol to about 2,000,000 g/mol. This may include an Mw of about 500 g/mol to about 500,000 g/mol, about 500 g/mol to about 100,000 g/mol, about 500 g/mol to about 50,000 g/mol, or about 500 g/mol to about 10,000 g/mol. Specific examples of Mw include about 500 g/mol, about 1,000 g/mol, about 5,000 g/mol, about 10,000 g/mol, about 20,000 g/mol, about 30,000 g/mol, about 40,000 g/mol, about 50,000 g/mol, about 60,000 g/mol, about 70,000 g/mol, about 80,000 g/mol, about 90,000 g/mol, about 100,000 g/mol, about 200,000 g/mol, about 250,000 g/mol, about 500,000 g/mol, about 750,000 g/mol, about 1,000,000 g/mol, about 2,000,000 g/mol, and ranges between any two of these values.

In some embodiments, the monomeric repeat unit is

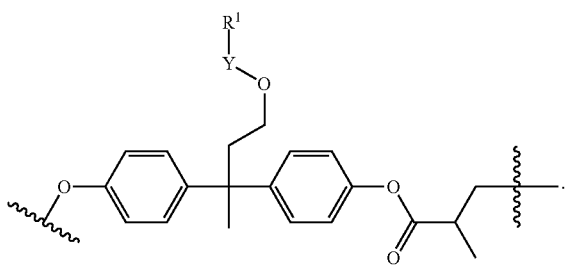

In other embodiments, the monomeric repeat unit is

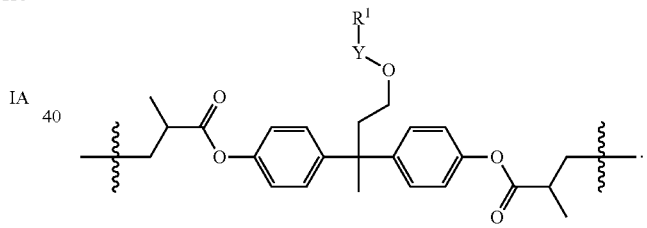

In Formula I and IA, $R^1$ can include a substituent that facilitates detection. For example, $R^1$ can be a tag, chromophoric moiety, radioisotope, or fluorescent moiety.

In accordance with another aspect, a polymer is provided, where the polymer is represented by Formula II:

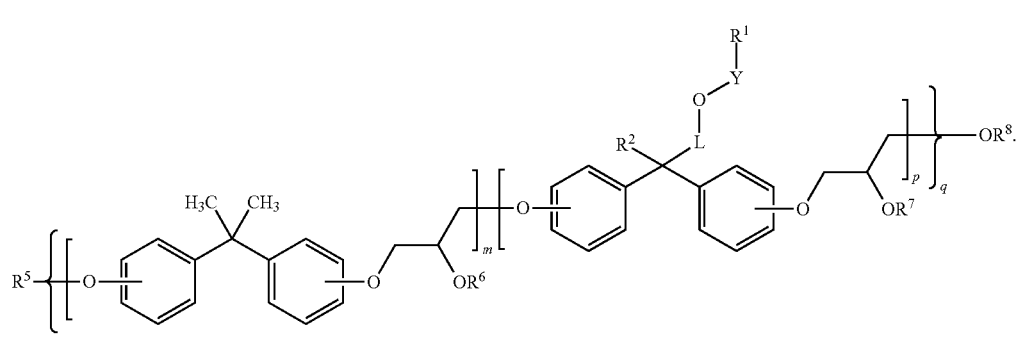

In Formula II, $R^1$ is alkyl, alkenyl, alkynyl, aryl, heteroaryl, cycloalkyl, or heterocyclyl; $R^2$ is alkyl; $R^5$, $R^6$, $R^7$ and $R^8$ are independently H or alkyl; Y is absent, C(O), $C_1$-$C_4$ alkylidene, or $C_1$-$C_4$ alkylideneamino; L is alkylidene, alkylidene-O-alkylidene, alkylidene-S-alkylidene, alkenylidene, cycloalkylidene, arylene, heteroarylene, C(O)O, or C(O)S; m, p and q are independently an integer of 1 to 10,000. Variables m, p, and q can be the same or different.

The polymers of Formula II have a weight average molecular weight (Mw) of about 500 g/mol to about 2,000,000 g/mol. This may include an Mw of about 500 g/mol to about 500,000 g/mol, about 500 g/mol to about 100,000 g/mol, about 500 g/mol to about 50,000 g/mol, or about 500 g/mol to about 10,000 g/mol. Specific examples of Mw include about 500 g/mol, about 1,000 g/mol, about 5,000 g/mol, about 10,000 g/mol, about 20,000 g/mol, about 30,000 g/mol, about 40,000 g/mol, about 50,000 g/mol, about 60,000 g/mol, about 70,000 g/mol, about 80,000 g/mol, about 90,000 g/mol, about 100,000 g/mol, about 200,000 g/mol, about 250,000 g/mol, about 500,000 g/mol, about 750,000 g/mol, about 1,000,000 g/mol, about 2,000,000 g/mol, and ranges between any two of these values.

In some embodiments, the polymer is represented by Formula III:

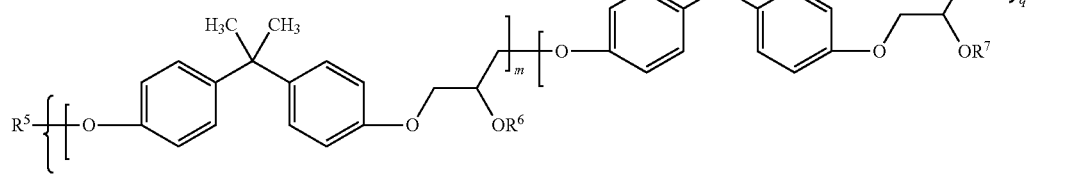

III

In Formula III, $R^5$, $R^6$, $R^7$ and $R^8$ may be H. Further, in some embodiments, L is —$CH_2CH_2$—. In some embodiments, Y is absent. In some embodiments, Y is C(O). In some embodiments, Y is —($C_1$-$C_4$ alkyl)-N($C_1$-$C_4$ alkyl)-. In some embodiments, Y is —$CH_2CH_2$—N($CH_2CH_3$)—.

In Formula III, $R^1$ may be alkyl. In some embodiments, $R^1$ is $^{13}CH_3$. In some embodiments, $R^1$ is aryl. In some embodiments, $R^1$ is heteroaryl. In some embodiments, $R^1$ has at least 5% $^{13}C$ enrichment at one or more carbon positions. In some embodiments, $R^1$ is a chromophoric moiety, a radioisotope, or a fluorescent moiety. In some embodiments, $R^1$ is a coumarin group, rhodamine amine, or diaryldiazo group.

For example, in some embodiments, the coumarin group is

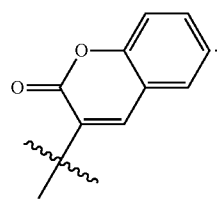

In some embodiments, the rhodamine amine is

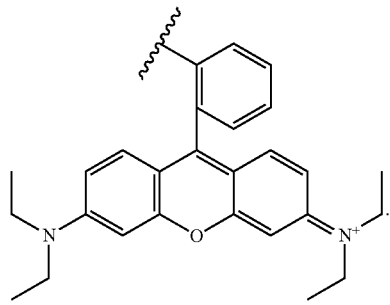 [SMILES: *c1ccccc1-c1c2ccc(=[N+](CC)CC)cc-2oc2cc(N(CC)CC)ccc12]

In some embodiments, the diaryldiazo group is

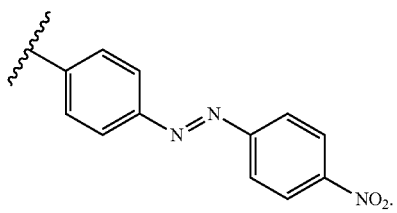 [SMILES: *c1ccc(/N=N/c2ccc([N+](=O)[O-])cc2)cc1]

In Formula III, $R^4$ can be halo. For example, $R^4$ can be bromo, chloro, fluoro, or iodo.

In some embodiments, the monomeric repeat units encompassed by [ ]$_m$ comprise at least about 90 wt % of the polymer. In some embodiments, the monomeric repeat units encompassed by [ ]$_m$ comprise at least about 99 wt % of the polymer.

The polymers of Formula III have a weight average molecular weight (Mw) of about 500 g/mol to about 2,000,000 g/mol. This may include an Mw of about 500 g/mol to about 500,000 g/mol, about 500 g/mol to about 100,000 g/mol, about 500 g/mol to about 50,000 g/mol, or about 500 g/mol to about 10,000 g/mol. Specific examples of Mw include about 500 g/mol, about 1,000 g/mol, about 5,000 g/mol, about 10,000 g/mol, about 20,000 g/mol, about 30,000 g/mol, about 40,000 g/mol, about 50,000 g/mol, about 60,000 g/mol, about 70,000 g/mol, about 80,000 g/mol, about 90,000 g/mol, about 100,000 g/mol, about 200,000 g/mol, about 250,000 g/mol, about 500,000 g/mol, about 750,000 g/mol, about 1,000,000 g/mol, about 2,000,000 g/mol, and ranges between any two of these values.

In some embodiments, m in Formula I, II, or III is 1 to 10,000, 1 to 1,000, 1 to 500, 1 to 250, 1 to 100, 1 to 50, or 1 to 10. Specific examples of m include 1, 2, 3, 4, 5, 6, 7, 8, 9, 10, 15, 20, 25, 30, 35, 40, 45, 50, 60, 70, 80 90, 100, 200, 250, 300, 400, 500, 750, 1,000, and ranges between any two of these values.

In some embodiments, p in Formula I, II, or III is 1 to 10,000, 1 to 1,000, 1 to 500, 1 to 250, 1 to 100, 1 to 50, or 1 to 10. Specific examples of m include 1, 2, 3, 4, 5, 6, 7, 8, 9, 10, 15, 20, 25, 30, 35, 40, 45, 50, 60, 70, 80 90, 100, 200, 250, 300, 400, 500, 750, 1,000, and ranges between any two of these values.

In some embodiments, q in Formula I, II, or III is 1 to 10,000, 1 to 1,000, 1 to 500, 1 to 250, 1 to 100, 1 to 50, or 1 to 10. Specific examples of m include 1, 2, 3, 4, 5, 6, 7, 8, 9, 10, 15, 20, 25, 30, 35, 40, 45, 50, 60, 70, 80 90, 100, 200, 250, 300, 400, 500, 750, 1,000, and ranges between any two of these values.

As noted, articles made from the tagged polymers described herein can be tracked from the time they are produced, after they enter the marketplace, and at the end of their product life cycle e.g., as they reach incinerators or recycling centers. Consequently, by measuring how much of a product is properly incinerated of or recycled, producers can more effectively estimate how much of the remaining products accumulate in the environment.

In accordance with another aspect, an article is provided, where the article includes a polymer, and where the polymer includes a monomeric repeat unit represented by Formula I

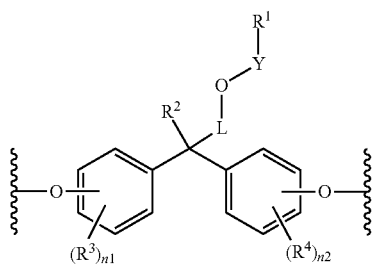

In Formula I, $R^1$ is alkyl, alkenyl, alkynyl, aryl, heteroaryl, cycloalkyl, or heterocyclyl; $R^2$ is alkyl; $R^3$ is alkyl, OH, halo, or alkoxy; $R^4$ is alkyl, OH, halo, or alkoxy; Y is absent, C(O), $C_1$-$C_4$ alkylidene, or $C_1$-$C_4$ alkylideneamino; L is alkylidene, alkylidene-O-alkylidene, alkylidene-S-alkylidene, alkenylidene, cycloalkylidene, arylene, heteroarylene, C(O)O, or C(O)S; n1 is 0, 1, 2, 3, or 4; and n2 is 0, 1, 2, 3, or 4.

In some embodiments, the article includes a polymer, where the polymer includes $R^1$, and where $R^1$ is a chromophoric moiety, radioisotope, or fluorescent moiety. In some embodiments, the article is fluorescent.

The polymers described herein are amenable to forming into a wide variety of articles as introduced above. The polymers may be formed into articles using techniques such as blowing, compaction molding, compression molding, injection molding, extrusion, rotomolding, vacuum molding, thermoforming, and the like as are known in the art.

In some embodiments, the polymers described herein can be incorporated into computer parts (e.g., mother boards, cables, and other plastic components) that will cause these parts to glow within the computer.

In accordance with another aspect, a method of preparing a polymer is provided, where the method includes contacting a compound of Formula IV with a compound of Formula V:

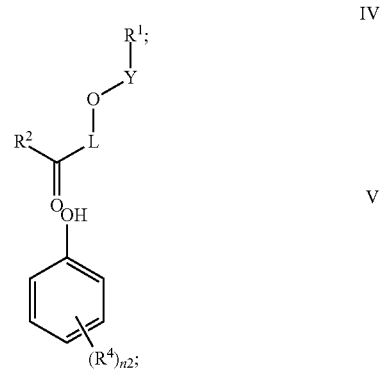

to form a compound of Formula VI

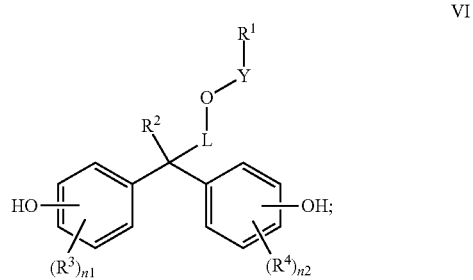

and contacting the compound of Formula VI with a linking compound to form the polymer, wherein the linking compound includes OC(O)O, $SO_2$, or an epoxide and the polymer includes any of the monomeric repeat units represented by Formula I, as described above.

In some embodiments, the monomeric repeat unit represented by Formula I is

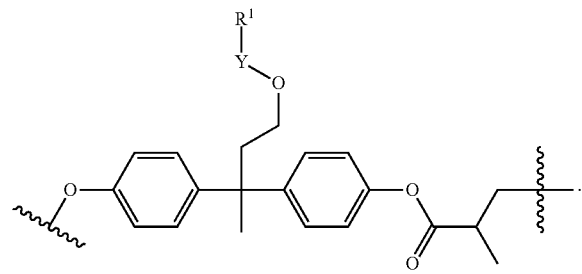

In some embodiments, the monomeric repeat unit represented by Formula I is

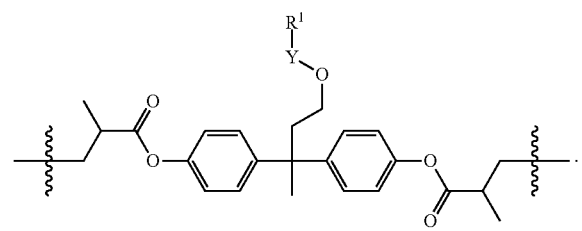

In some embodiments, the method may further include contacting the compound of Formula IV with an acid catalyst. In some embodiments, the acid catalyst is HCl, $H_2SO_4$, acetic acid, methanesulfonic acid, p-toluenesulfonic acid, or combinations of any two or more such catalysts. In some embodiments, the compound of Formula VI is contacted with the linking compound in a solution at a pH of about 1 to about 6.

Alternatively, in some embodiments, the method may further include contacting the compound of Formula IV with a basic catalyst. In some embodiments, the base is a tertiary amine, secondary amine, pyridine, or a carbonate salt. In some embodiments, the base is a carbonate salt, hydroxide salt, or an amine, wherein the amine is selected from diisopropylethylamine (DIPEA), triethylamine, piperidine, pyridine, 1,4-diazo-bicyclo[2.2.2]octane, morpholine, N-methyl morpholine, tetramethyl butane diamine, bis(2-dimethylaminoethyl)ether, piperidine, N-methypiperidine, piperazine, N-methylpiperazine, N,N-dimethylpiperazine, or combinations of any two or more such bases. In some embodiments, the compound of Formula VI is contacted with the linking compound in a solution at a pH of about 7 to about 13.

In some embodiments, the linking compound is epichlorohydrin (chloromethyloxirane), 2,2'-oxybis(methylene)dioxirane, 2-hydroxypropyl acrylate, acrylic acid, or a combination thereof.

In some embodiments, the linking compound is epichlorohydrin and the method further includes contacting the compound of Formula VI with bisphenol A to form a polymer represented by Formula II:

In accordance with another aspect, a method of tracking an article is provided, where the method includes determining the presence of a polymer within the article, wherein the polymer includes any of the above monomeric repeat unit represented by Formula I.

In some embodiments, the presence of the polymer within the article is characterized by a method selected from nuclear magnetic resonance spectroscopy (NMR), infrared spectroscopy, mass spectrometry, fluorimetry, radioisotopic decay detection, and ultraviolet spectroscopy. For example, NMR may be used to identify specific atomic attachments within the $R^1$ group and their relative abundance to other groups. The NMR, may be based upon $^1H$, $^{13}C$, $^{17}O$, $^{19}F$, $^{31}P$, and other NMR active species within the molecule. Where the $R^1$ group is a fluorophore, fluorimetry may be used to identify the presence or absence of the group and its relative abundance. Where the $R^1$ group contains a radioisotope, for example, $^1H$, $^{14}C$, and other radioisotopes that are readily incorporated in organic groups, various scintillators or radioactive detection devices may be used to measure the presence or absence of such a group, especially where the radioisotope is enriched in comparison to the natural abundance of the isotope that would otherwise be present. Where the group has a unique UV signature or resonance, UV spectroscopy may be used to identify the presence or absence of the $R^1$ group.

In some embodiments, the method further includes determining whether the article has been recycled by confirmation of the presence of the polymer in the article.

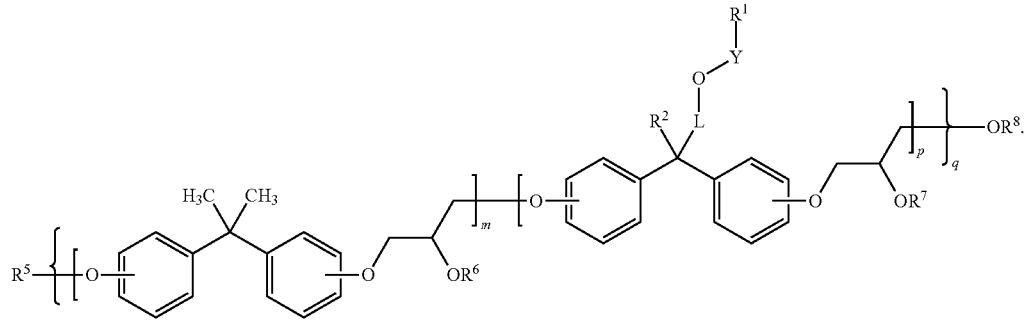

In Formula II, $R^5$, $R^6$, $R^7$ and $R^8$ are independently H or alkyl; and m, p and q are independently an integer between 1 and 10,000, inclusive.

In some embodiments, the method includes a polymer represented by Formula III:

The present technology, thus generally described, will be understood more readily by reference to the following Examples, which are provided by way of illustration and are not intended to be limiting of the present technology.

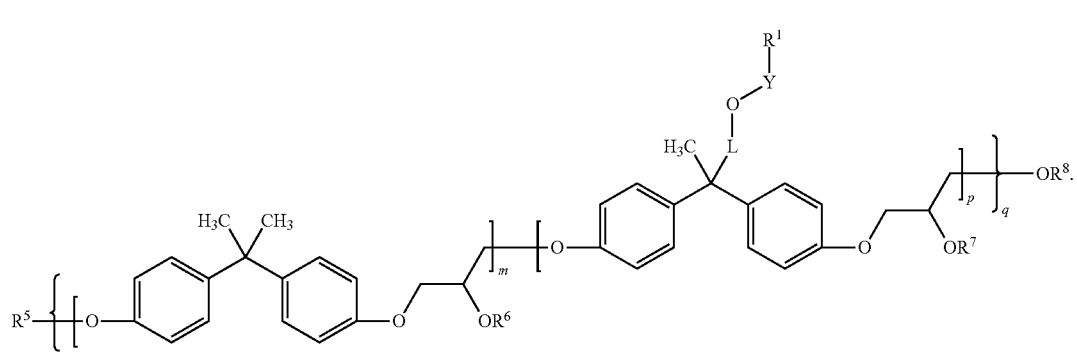

EXAMPLES

Example 1

Synthesis of diphenols. As shown in Scheme 1, a ketone such as 4-hydroxybutan-2-one (1 molar equivalent), phenol (2 molar equivalents) and $H_2SO_4$ (0.05 molar equivalents) are to be combined in the absence or presence of a solvent (e.g., tetrahydrofuran, dimethylformamide, $CH_2Cl_2$ etc.) at a temperature of about 25° C. to about 100° C. to produce diphenols 1.1, 1.2, and 1.3.

Scheme 1

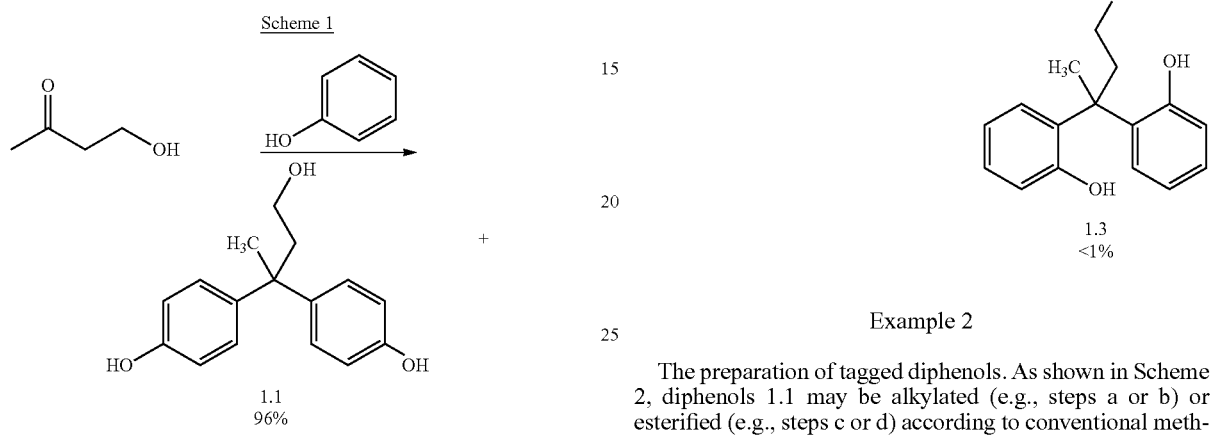

Example 2

The preparation of tagged diphenols. As shown in Scheme 2, diphenols 1.1 may be alkylated (e.g., steps a or b) or esterified (e.g., steps c or d) according to conventional methods to yield the illustrative diphenols 2.1, 2.2, 2.3, and 2.4.

Scheme 2

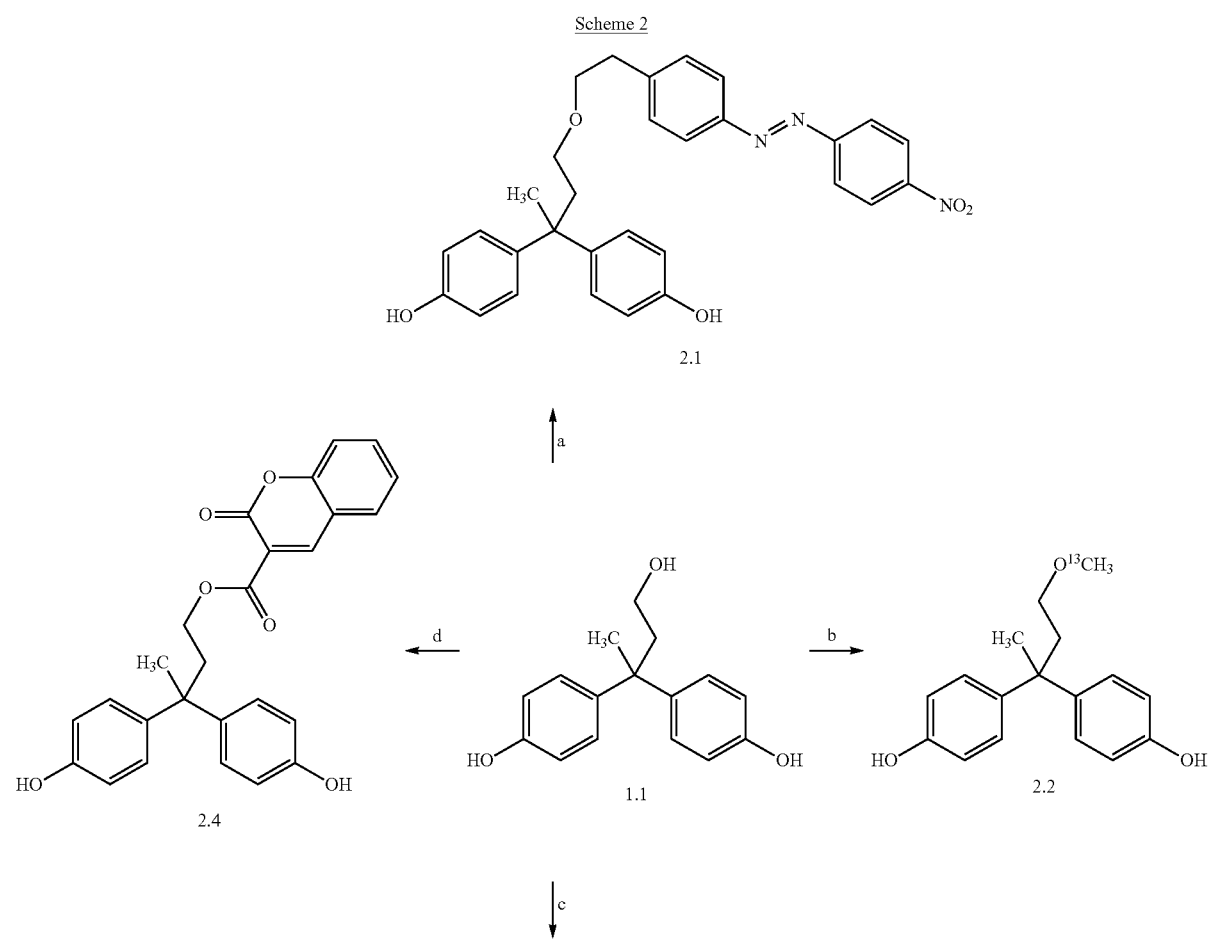

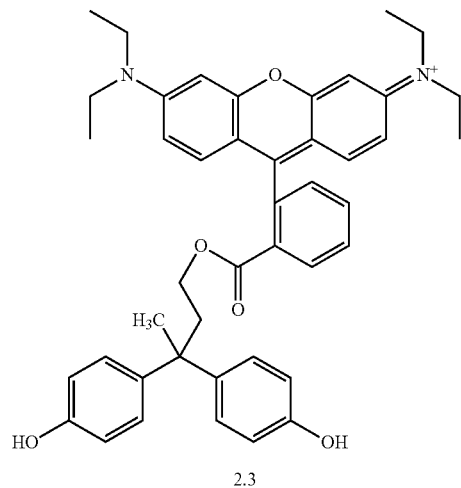

2.3

Example 3

The preparation of tagged diphenol 2.4 (3,3-bis(4-hydroxyphenyl)butyl 2-oxo-2H-chromene-3-carboxylate). Phenol (200 mmol) and a catalyst (e.g., $Cs_{2.5}H_{0.25}DEAT_{0.25}PW_{12}O_{40}$, 0.5 g) can be combined under nitrogen in a 250 mL three necked flask equipped with a condenser and a magnetic stirrer and heated to 80° C. with stirring. A tagged ketone (20 mmol), such as 2-oxo-2H-chromene-3-carboxylic acid 3-oxo-butyl ester, can be added and diphenol 2.4 can be produced with high (e.g., approximately 96%) selectivity for the p,p-isomer.

Example 4

Synthesis of 2-oxo-2H-chromene-3-carboxylic acid 3-oxo-butyl ester. 2-Oxo-2H-chromene-3-carboxylic acid 3-oxo-butyl ester can be prepared as shown below according to methods described in *Applied Catalysis A: General* Volume 380, Issues 1-2, 31 May 2010, Pages 33-39.

Step 1: 3-(Chloromethyl)-2H-chromen-2-one (19.461 g, 100 mmol) is dissolved into 100 mL of anhydrous THF in a three neck flask equipped with a condenser, stir bar, and argon inlet. To the mixture is added 27.6 g (200 mmol) of anhydrous potassium carbonate and 2.0 g of 18-crown-6. 4-Hydroxy-2-butanone (16.2 g, 200 mmol) is added and the system is refluxed for 16 hours, cooled to room temperature, filtered, and the organic solvents are removed by rotary evaporation. The solid organic residue is purified by column chromatography using 3:1 ethyl acetate:hexanes to yield 3-(3-oxo-butoxymethyl)-chromen-2-one.

Step 2: 3-Hydroxy-chromen-2-one (16.2 g, 100 mmol) is dissolved into 100 mL of anhydrous THF in a three neck flask equipped with a condenser, stir bar, and argon inlet. To the mixture is added 27.6 g (200 mmol) of anhydrous potassium carbonate and 2.0 g of 18-crown-6. 4-Chloro-2-butanone (15.9 g, 150 mmol) is added and the system is refluxed for 16 hours, cooled to room temperature, filtered, and the organic solvents are removed by rotary evaporation. The solid organic residue is purified by column chromatography using 3:1 ethyl acetate:hexanes to yield 3-(3-oxo-butoxy)-chromen-2-one.

Step 3: Coumarin-3-carboxylic acid (25.0 g, 131 mmol) is dissolved into 100 mL of 4-hydroxy-2-butanone with ~0.050 g of para-toluene sulfonic acid in a round bottom flask equipped with a stir bar and condenser packed with molecular sieves. The pressure is reduced to ~15 mmHg and the system is refluxed for 10 hours. The solvents are removed by rotary evaporation. The solid organic residue is purified by column chromatography using 3:1 ethyl acetate:hexanes to yield 2-oxo-2H-chromene-3-carboxylic acid 3-oxo-butyl ester.

Example 5

The polymerization of tagged diphenols. As shown in Scheme 3, 4,4'-(propane-2,2-diyl)diphenol (approximately 20 equivalents), diphenol 2.4 (approximately 1 equivalent), epichlorohydrin (approximately 18 equivalents), and a base (e.g., pyridine) are combined in the absence or presence of a solvent (e.g., tetrahydrofuran, dimethylformamide, $CH_2Cl_2$ etc.) at a temperature of about 25° C. to about 100° C. to produce polymer 3.1, where m, p and q are independently an integer of 1 to 10,000.

Scheme 3

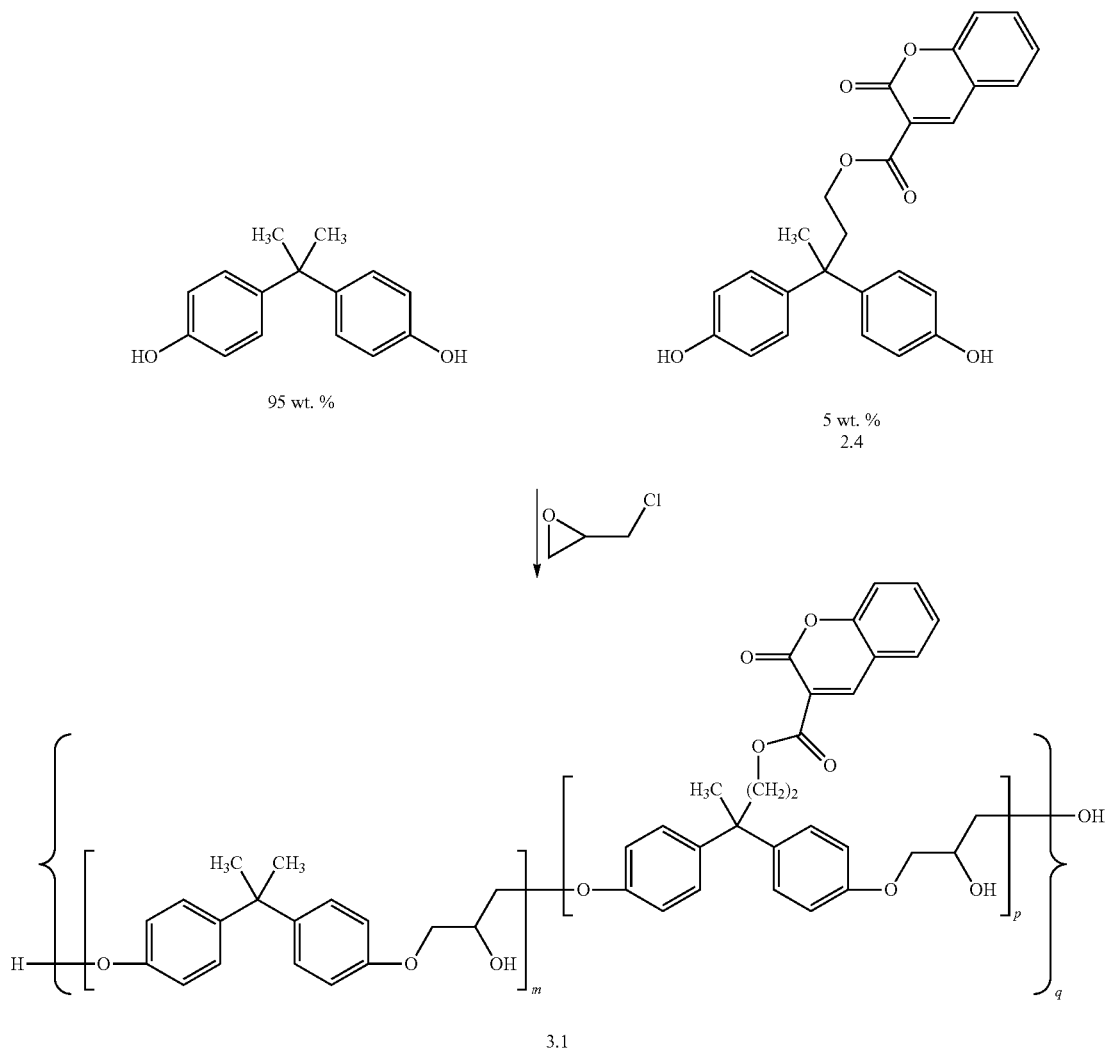

3.1

Example 6

Incorporation of tagged bisphenols into computer parts. The polymers described herein, such as polymer 3.1, can be incorporated into computer parts (e.g., mother boards, cables, and other plastic components). These computer parts are produced, enter the market place, and are eventually discarded or recycled at the end of their useful life. The recycled computer parts can be tracked at recycling centers because the chromophoric moiety in polymer 3.1 can be characterized by conventional means (e.g., ultraviolet spectroscopy). As such, the quantity of computer parts that are recycled, relative to those that are discarded, can be estimated and monitored.

EQUIVALENTS

The embodiments, illustratively described herein may suitably be practiced in the absence of any element or elements, limitation or limitations, not specifically disclosed herein. Thus, for example, the terms 'comprising,' 'including,' 'containing,' etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into subranges as discussed above. Similarly, the phrase "at least about" some value such as, e.g., wt % includes at least the value and about the value. For example "at least about 1 wt %" means "at least 1 wt % or about 1 wt %." Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

What is claimed is:

1. A polymer comprising a monomeric repeat unit represented by Formula I:

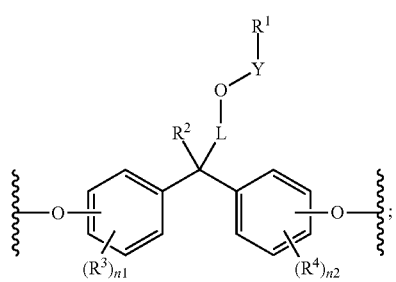

wherein:
R$^1$ is alkenyl, alkynyl, aryl, heteroaryl, cycloalkyl, or heterocyclyl;
R$^2$ is alkyl, haloalkyl, alkenyl, or alkynyl;
R$^3$ is alkyl, OH, halo, or alkoxy;
R$^4$ is alkyl, OH, halo, or alkoxy;
Y is absent, C(O), C$_1$-C$_4$ alkylidene, or C$_1$-C$_4$ alkylideneamino;
L is alkylidene, alkylidene-O-alkylidene, alkylidene-S-alkylidene, alkenylidene, cycloalkylidene, arylene, heteroarylene, C(O)O, or C(O)S;
n1 is 0, 1, 2, 3, or 4; and
n2 is 0, 1, 2, 3, or 4.

2. The polymer of claim 1, wherein the monomeric repeat unit is represented by Formula IA:

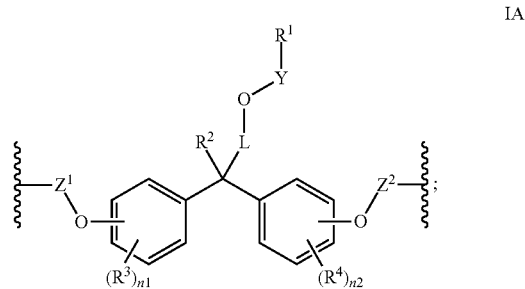

wherein:
Z$^1$ is absent, CO, SO$_2$, a residue derived from an acrylate, or a residue derived from an epoxide; and
Z$^2$ is absent, CO, SO$_2$, a residue derived from an acrylate, or a residue derived from an epoxide.

3. The polymer of claim 1, wherein the monomeric repeat unit is

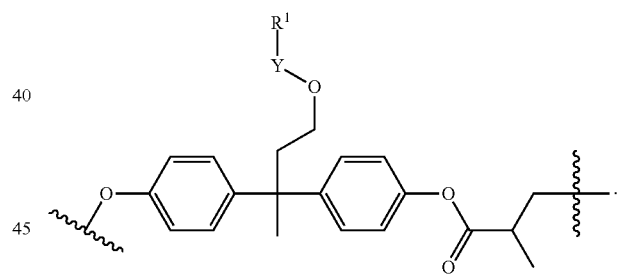

4. The polymer of claim 1, wherein the monomeric repeat unit is

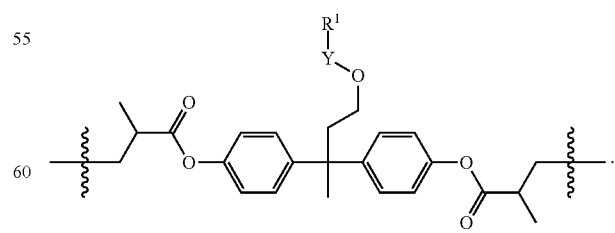

5. The polymer of claim 1, wherein R$^1$ is a chromophore, or fluorophore, or wherein R$^1$ contains a radioisotope.

6. The polymer of claim 1, wherein R$^4$ is halo.

7. A polymer represented by Formula II:

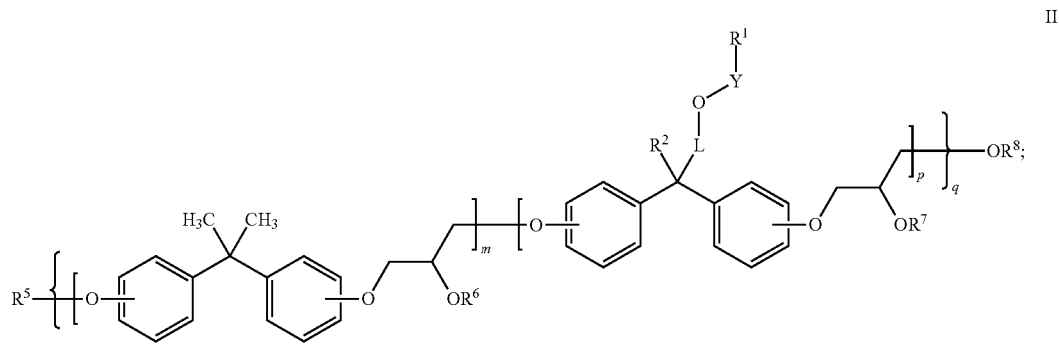

wherein:
- $R^1$ is alkyl, alkenyl, alkynyl, aryl, heteroaryl, cycloalkyl, or heterocyclyl;
- $R^2$ is alkyl;
- $R^5$, $R^6$, $R^7$, and $R^8$ are independently H or alkyl;
- Y is absent, C(O), $C_1$-$C_4$ alkylidene, or $C_1$-$C_4$ alkylideneamino;
- L is alkylidene, alkylidene-O-alkylidene, alkylidene-S-alkylidene, alkenylidene, cycloalkylidene, arylene, heteroarylene, C(O)O, or C(O)S; and
- m, p, and q are independently an integer of 1 to 10,000.

8. The polymer of claim 7, wherein the polymer is represented by Formula III:

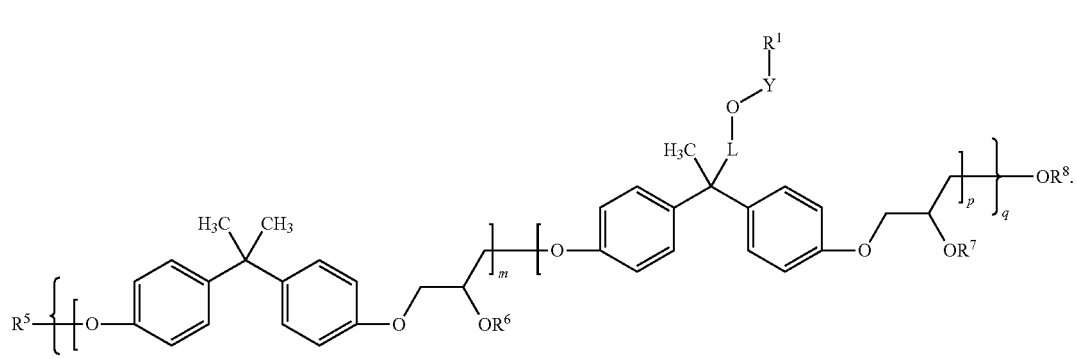

9. The polymer of claim 7, wherein $R^5$, $R^6$, $R^7$, and $R^8$ are H.

10. The polymer of claim 7, wherein L is —$CH_2CH_2$—.

11. The polymer of claim 7, wherein Y is absent.

12. The polymer of claim 7, wherein Y is C(O).

13. The polymer of claim 7, wherein Y is —($C_1$-$C_4$ alkylidene)-N($C_1$-$C_4$ alkyl)-.

14. The polymer of claim 13, wherein Y is —$CH_2CH_2$—N($CH_2CH_3$)—.

15. The polymer of claim 7, wherein $R^1$ is alkyl.

16. The polymer of claim 15, wherein $R^1$ is $^{13}CH_3$.

17. The polymer of claim 7, wherein $R^1$ is

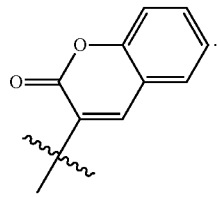 [SMILES: *c1cc2ccccc2oc1=O ; "."]

18. The polymer of claim 7, wherein $R^1$ is

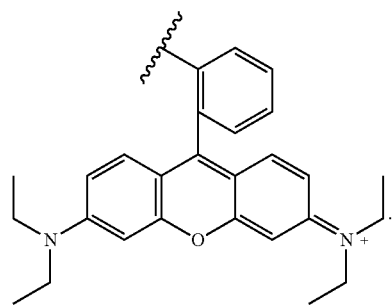

19. The polymer of claim 7, wherein $R^1$ is

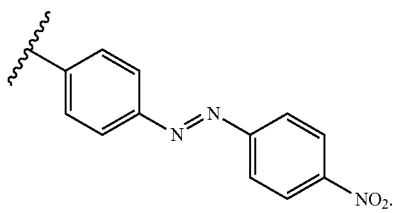 [SMILES: *c1ccc(/N=N/c2ccc([N+](=O)[O-])cc2)cc1]

20. A method of preparing a polymer, the method comprising:

contacting a compound of Formula IV with a compound of Formula V

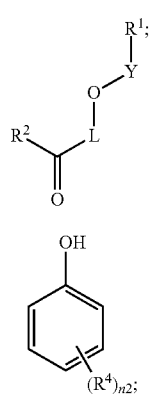

to form a compound of Formula VI

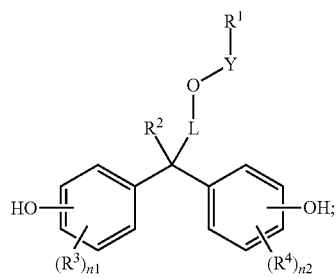

and contacting the compound of Formula VI with a linking compound to form the polymer, wherein the linking compound comprises OC(O)O, $SO_2$, or an epoxide and the polymer comprises a monomeric repeat unit represented by Formula I

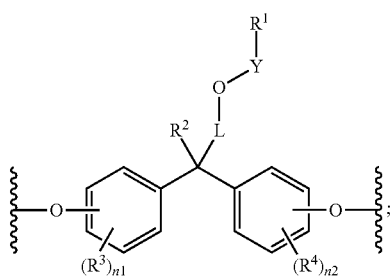

wherein:

$R^1$ is alkenyl, alkynyl, aryl, heteroaryl, cycloalkyl, or heterocyclyl;

$R^2$ is alkyl;

$R^3$ is alkyl, OH, halo, or alkoxy;

$R^4$ is alkyl, OH, halo, or alkoxy;

Y is absent, C(O), $C_1$-$C_4$ alkylidene, or $C_1$-$C_4$ alkylidene-amino;

L is alkylidene, alkylidene-O-alkylidene, alkylidene-S-alkylidene, alkenylidene, cycloalkylidene, arylene, heteroarylene, C(O)O, or C(O)S;

n1 is 0, 1, 2, 3, or 4; and n2 is 0, 1, 2, 3, or 4.

* * * * *

UNITED STATES PATENT AND TRADEMARK OFFICE
CERTIFICATE OF CORRECTION

| | |
|---|---|
| PATENT NO. | : 9,238,712 B2 |
| APPLICATION NO. | : 13/827155 |
| DATED | : January 19, 2016 |
| INVENTOR(S) | : Carlson et al. |

It is certified that error appears in the above-identified patent and that said Letters Patent is hereby corrected as shown below:

On the Title Page, in Item (73), under "Assignee", in Column 1, Lines 1-3, delete "EMPIRE TECHNOLOGY DEVELOPMENTS LLC, Wilmington DE (US)" and insert -- EMPIRE TECHNOLOGY DEVELOPMENT LLC, Wilmington, DE (US) --, therefor.

Signed and Sealed this
Twenty-sixth Day of April, 2016

Michelle K. Lee
*Director of the United States Patent and Trademark Office*